(12) United States Patent
Sung et al.

(10) Patent No.: US 8,340,927 B2
(45) Date of Patent: Dec. 25, 2012

(54) APPARATUS FOR MEASURING FLOW VELOCITY AND FLOW RATE OF GROUNDWATER LEAKING FROM EARTH SURFACE AND APPARATUS FOR MONITORING THE SAME

(75) Inventors: Ki-Sung Sung, Incheon (KR);
Jeong-Chan Kim, Daejeon (KR);
Kue-Young Kim, Daejeon (KR);
Tae-Hee Kim, Daejeon (KR)

(73) Assignee: Korea Institute of Geoscience and Mineral Resources (KIGAM), Daejeon (KR)

( * ) Notice: Subject to any disclaimer, the term of this patent is extended or adjusted under 35 U.S.C. 154(b) by 324 days.

(21) Appl. No.: 12/862,219

(22) Filed: Aug. 24, 2010

(65) Prior Publication Data
US 2011/0270540 A1 Nov. 3, 2011

(30) Foreign Application Priority Data
Apr. 30, 2010 (KR) .......................... 10-2010-0040606

(51) Int. Cl.
*G01F 1/37* (2006.01)
*G01F 23/14* (2006.01)
*G06F 19/00* (2011.01)

(52) U.S. Cl. .............. 702/47; 73/25.03; 702/50; 702/51

(58) Field of Classification Search .................... 702/45, 702/47, 50, 51, 98, 100, 138; 73/25.03, 861.49; 700/284
See application file for complete search history.

(56) References Cited

U.S. PATENT DOCUMENTS
2010/0294021 A1* 11/2010 Makino et al. ............... 73/25.03

FOREIGN PATENT DOCUMENTS
| JP | 2001-082988 | 3/2001 |
| KR | 10-20050102853 | 10/2005 |
| KR | 100689844 | 2/2007 |
| KR | 10-0914380 | 9/2009 |

* cited by examiner

*Primary Examiner* — John H Le
(74) *Attorney, Agent, or Firm* — Chapin IP Law, LLC (57) ABSTRACT

An apparatus for measuring a flow velocity and a flow rate of groundwater leaking from the earth surface includes: a storage tank that is fixed to close a side surface and a top surface of an earth surface region from which the groundwater leaks and that stores the groundwater leaking from the earth surface; a liquid column tube that causes the groundwater stored in the storage tank to introduce thereto and causes a water column to rise; and a pressure-type measuring unit that is formed in a top opening of the liquid column tube and that senses a differential pressure. Accordingly, it is possible to easily and rapidly measure a flow velocity and a flow rate of groundwater leaking from the earth surface by the use of a user's terminal in real time, or by time zones, or on the user's request.

20 Claims, 6 Drawing Sheets

APPARATUS FOR MEASURING FLOW VELOCITY AND FLOW RATE OF GROUNDWATER LEAKING FROM EARTH SURFACE AND APPARATUS FOR MONITORING THE SAME

RELATED APPLICATIONS

This application claims priority to and the benefit of Korean Patent Application No. 10-2010-0040606 filed on Apr. 30, 2010 the contents and teachings of which are hereby incorporated by reference in their entirety.

BACKGROUND

1. Field of the Invention

The present invention relates to an apparatus for measuring a flow velocity and a flow rate of groundwater leaking from the earth surface and an apparatus for monitoring the same, and more particularly, to an apparatus for measuring a flow velocity and a flow rate of groundwater leaking from the earth surface and an apparatus for monitoring the same, which can easily and rapidly measure a flow velocity and a flow rate of groundwater leaking from the earth surface and can monitor data on the measured flow velocity and flow rate of groundwater by the use of a user's terminal in real time, or by time zones, or on the user's request.

2. Description of the Related Art

Groundwater occupies 1% or less of the total water in the earth and is contained in spaces of bedrocks and soil. The source of the most groundwater is a rain. Some of the rain soaks into the ground to form a groundwater system and the other of the rain flows through the ground or over the earth surface to the sea.

All the water in the ground is not defined as groundwater. The Korean Groundwater Act defines the groundwater as "water filling voids among underground layers or rocks".

The groundwater flows to the lake or the seabed and this flow is affected by constituents of the soil. For example, groundwater in a limestone region rapidly moves by several meters per hour, but groundwater in the most other regions slowly moves by several meters per year.

The groundwater is an important water resource. Accordingly, to effectively manage and utilize the groundwater, it is necessary to accurately measure a flow velocity and a flow rate of the groundwater leaking from the earth surface.

However, the flow velocity and the flow rate of the groundwater cannot be measured by only an operator's or supervisor's eyes and it is thus difficult to accurately and rapidly measure the flow velocity and the flow rate of the groundwater leaking form the earth surface.

Therefore, in order to enhance the utilization value of the groundwater which is an important water resource on the earth, there is a need for a measuring apparatus which can accurately and rapidly measure the flow velocity and the flow rate of the groundwater leaking from the earth surface in real time and there is also a need for a monitoring apparatus which can easily collect and monitor the measured data.

SUMMARY

An advantage of some aspects of the invention is that it provides an apparatus for measuring a flow velocity and a flow rate of groundwater leaking from the earth surface and an apparatus for monitoring the same, which can easily and rapidly measure a flow velocity and a flow rate of groundwater leaking from the earth surface.

Another advantage of some aspects of the invention is that it provides a monitoring apparatus employing the apparatus for measuring a flow velocity and a flow rate, which can easily collect or monitor data on measured flow velocity and flow rate of groundwater anywhere and at any time.

According to an aspect of the invention, there is provided an apparatus for measuring a flow velocity and a flow rate of groundwater leaking from the earth surface, including: a storage tank that is fixed to close a side surface and a top surface of an earth surface region from which the groundwater leaks and that stores the groundwater leaking from the earth surface; a liquid column tube that causes the groundwater stored in the storage tank to introduce thereto and causes a water column to rise; and a pressure-type measuring unit that is formed in a top opening of the liquid column tube and that senses a differential pressure on the basis of a water head difference of the water column rising in the liquid column tube to detect the flow velocity and the flow rate of the groundwater leaking from the earth surface.

One or more of the storage tanks may be fixedly disposed in an earth surface region from which the groundwater leaks and the storage tank may have a cylindrical shape.

A connection hose forming a pipeline between the storage tank and the liquid column tube may be formed between the storage tank and the liquid column tube so that the groundwater leaking from the earth surface region and being stored in the storage tank flows into the liquid column tube. The connection hose may have one end connected to an upper part of the storage tank and the other end connected to a lower part of the liquid column tube.

A socket for connection of the connection hose may be disposed in the lower part of the liquid column tube.

A tripod for fixing the position and posture of the liquid column tube may be further disposed in the liquid column tube.

An automatic switch may be disposed in the upper part or the lower of the liquid column tube.

The pressure-type measuring unit may be a differential pressure transmitter.

A pedestal for fixedly disposing the pressure-type measuring unit may be disposed on a top opening of the liquid column tube.

According to another aspect of the invention, there is provided a monitoring apparatus employing an apparatus for measuring a flow velocity and a flow rate of groundwater leaking from the earth surface, including: a storage tank that is fixed to close a side surface and a top surface of an earth surface region from which the groundwater leaks and that stores the groundwater leaking from the earth surface; a liquid column tube that causes the groundwater stored in the storage tank to introduce thereto and causes a water column to rise; a pressure-type measuring unit that is formed in a top opening of the liquid column tube and that senses a differential pressure on the basis of a water head difference of the water column rising in the liquid column tube to detect the flow velocity and the flow rate of the groundwater leaking from the earth surface; a communication interface unit that transmits data on the flow velocity and the flow rate of the groundwater detected by the pressure-type measuring unit; and a combined server unit that stores the data transmitted from the communication interface unit, compares the data with a predetermined reference value, and transmits the data stored or compared with the reference value to a user terminal in real time, or by time zones, or on a user's request.

Here, the combined server unit may include: a data input unit that receives the data on the flow velocity and the flow rate from the communication interface unit; a data storage unit that stores the data received by the data input unit in real time or by time zones; a data computing unit that compares the data received by the data input unit with a predetermined reference value and analyzes and computes the data to prepare statistical data on the flow velocity and the flow rate of the groundwater in accordance with the user's instruction; and a control unit that controls operations of the data input unit, the data storage unit, and the data computing unit.

The data on the flow velocity and the flow rate of the groundwater transmitted from the combined server unit may be transmitted to the user terminal in the form of any one of text information, image information, and sound information. Here, when the user terminal is a portable communication terminal, text information and simple image information can be simultaneously transmitted using commercialized SMS (Short Messaging Service) or MMS (Multimedia Messaging Service).

The combined server unit may further include a preliminary DB unit that separately stores the data transmitted from the communication interface unit and a data difference between the data and the predetermined reference value.

One or more of the storage tanks may be fixedly disposed in an earth surface region from which the groundwater leaks and the storage tank may have a cylindrical shape.

A connection hose forming a pipeline between the storage tank and the liquid column tube may be formed between the storage tank and the liquid column tube so that the groundwater leaking from the earth surface region and being stored in the storage tank flows into the liquid column tube. The connection hose may have one end connected to an upper part of the storage tank and the other end connected to a lower part of the liquid column tube.

A socket for connection of the connection hose may be disposed in the lower part of the liquid column tube.

A tripod for fixing the position and posture of the liquid column tube may be further disposed in the liquid column tube.

An automatic switch may be disposed in the upper part or the lower of the liquid column tube.

The pressure-type measuring unit may be a differential pressure transmitter.

A pedestal for fixedly disposing the pressure-type measuring unit may be disposed on a top opening of the liquid column tube.

In the apparatus for measuring a flow velocity and a flow rate of groundwater leaking from the earth surface and the apparatus for monitoring a flow velocity and a flow rate of groundwater leaking from the earth surface according to the invention, it is possible to easily measure the flow velocity and the flow rate of the groundwater leaking from the earth surface on the basis of the water head difference of the water column rising in the liquid column tube, using the chamber disposed on the earth surface, a piezometer-type longitudinal liquid column tube connected thereto and disposed upright, and a pressure sensor such as a differential pressure transmitter disposed on the top of the liquid column tube.

In the apparatus for measuring a flow velocity and a flow rate of groundwater leaking from the earth surface and the apparatus for monitoring a flow velocity and a flow rate of groundwater leaking from the earth surface according to the invention, since the data on the measured flow velocity and flow rate of the groundwater is rapidly provided as various types of information such as characters, images, and sounds to a user terminal (for example, a mobile phone, a PDA, and a PC) in real time, or by time zones, or on the user's request, it is possible to easily collect and monitor the information on the leakage of the groundwater anywhere and anytime.

DESCRIPTION OF EXEMPLARY EMBODIMENTS

Hereinafter, an apparatus for measuring a flow velocity and a flow rate of groundwater leaking from the earth surface and an apparatus for monitoring a flow velocity and a flow rate of groundwater leaking from the earth surface according to exemplary embodiments of the invention will be described in detail with reference to the accompanying drawings.

Advantages and features of the invention and methods for putting them into practice will be apparent from the following embodiments and drawings. However, the invention is not limited to the embodiments, but can be modified in various forms. The embodiments are provided to complete the disclosure of the invention and to completely notify the scope of the invention to those skilled in the art. When it is determined that related known techniques make the spirit of the invention vague in describing the invention, detailed description thereof is not made.

Figure 1:
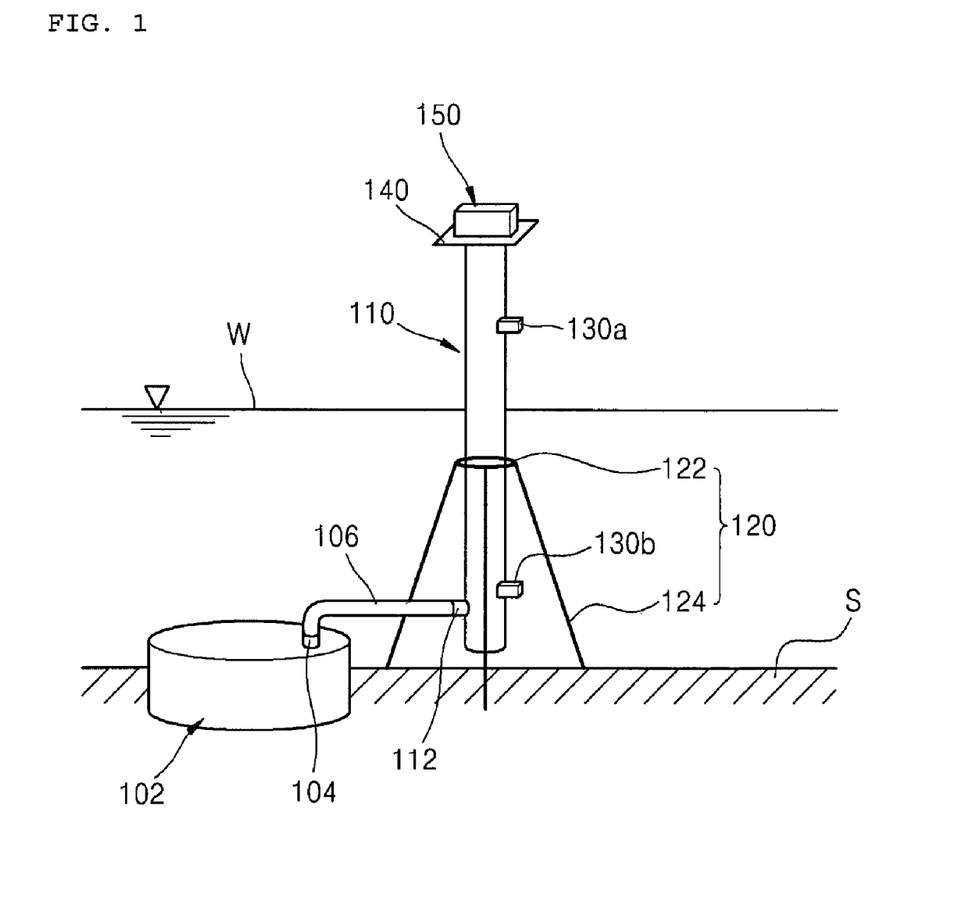
FIG. 1 is a conceptual diagram illustrating an apparatus for measuring a flow velocity and a flow rate of groundwater leaking from the earth surface according to an embodiment of the invention.

FIG. 1 is a perspective view illustrating an apparatus for measuring a flow velocity and a flow rate of groundwater leaking from the earth surface. In the drawing, only specified parts are shown to conceptually clearly understand the configurational relation of the invention. Accordingly, the drawing can be modified in various forms and the invention is thus not limited to the shown configuration.

Referring to FIG. 1, the shown apparatus for measuring a flow velocity and a flow rate of groundwater leaking from the earth surface includes a storage tank 102 that stores groundwater leaking from the earth surface S, a liquid column tube 110 that causes the groundwater stored in the storage tank 102 to introduce thereto and causes a water column to rise, and a pressure-type measuring unit 150 that senses a differential pressure on the basis of a water head difference of the water column rising in the liquid column tube 110 to detect the flow velocity and the flow rate of the groundwater.

The storage tank 102 will be first described.

The storage tank 102 means a container or a tank also called a chamber.

The bottom of the storage tank 102 is opened to the earth surface S from which the groundwater leaks and the side surface and the top surface thereof are closed, so as to store the groundwater, which is introduced from the bottom of the storage tank 102, that is, which leaks from an earth surface region in which the storage tank 102 is fixedly disposed to form a closed space.

The storage tank 102 may have a cylindrical shape as shown in FIG. 1. However, this shape is only a preferable example, and thus the invention is not limited to the shape. Therefore, the shape and the size may be modified in various forms, which belong to the scope of the invention.

The place in which the storage tank 102 is installed is an earth surface (S) region which is filled with surface water W and from which the groundwater can leak: for example, a reservoir in which groundwater can leak from the bottom thereof.

Since the storage tank 102 is disposed in water, the storage tank is preferably formed of a material which is excellent in corrosion resistance and abrasion resistance. In addition, the storage tank is preferably formed of a material which is excellent in contamination resistance so as not to contaminate underwater ecosystem.

Since the shape of the storage tank 102 should not be deformed even with a predetermined internal pressure due to a variation in flow rate of the groundwater therein, the storage tank is preferably formed of a rigid material having a great strength.

On the other hand, one or more of the storage tanks 102 may be fixedly disposed in the earth surface S region from which the groundwater leaks. For example, three storage tanks 102 are disposed in the same earth surface S region in FIG. 2.

Figure 2:
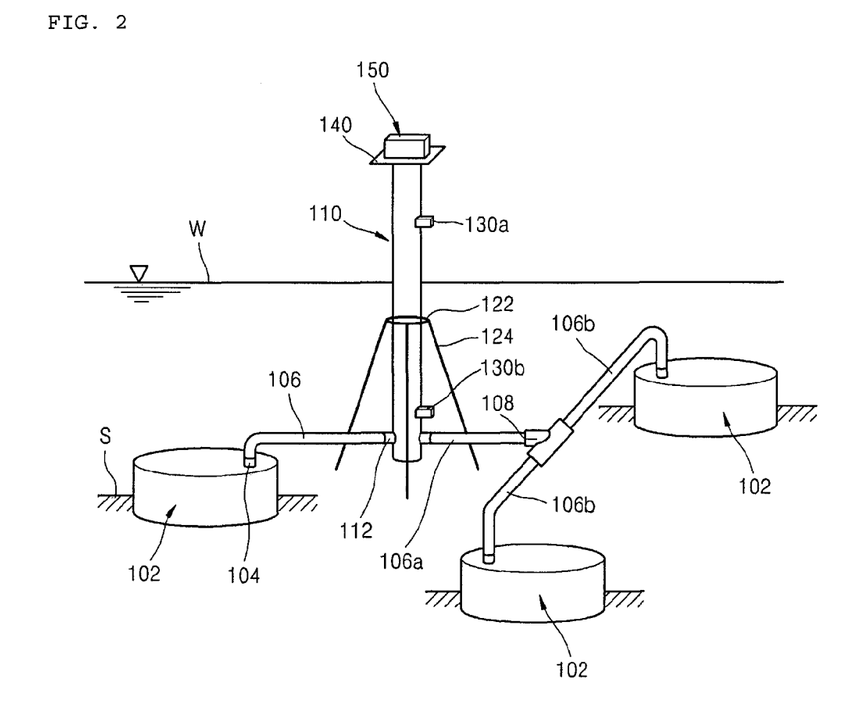
FIG. 2 is a conceptual diagram illustrating an apparatus for measuring a flow velocity and a flow rate of groundwater leaking from the earth surface according to another embodiment of the invention in which plural storage tanks are used.

As shown in FIG. 2, when one or more storage tanks 102 are disposed in the earth surface S region, the amounts of groundwater introduced into the storage tanks 102 are averaged to detect a water head difference of the water column in the liquid column tube 110. Accordingly, it is possible to more accurately detect data, compared with the case where a single storage tank 102 is used as shown in FIG. 1.

Referring to FIG. 1 gain, the liquid column tube 110 will be described.

The liquid column tube 110 is an instrument that is connected to the storage tank 102, receives the groundwater stored in the storage tank 102 to cause the water column to rise, and allows the measurement of a differential pressure on the basis of the water head difference of the rising water column.

That is, the liquid column tube 110 employs a piezometer type and is used to measure a static pressure of the groundwater introduced thereto.

The liquid column tube 110 has a longitudinal tube shape having a circular section with the same diameter and shape all over the length thereof, and the inner surface thereof is preferably a smooth surface having a very low surface roughness.

The sectional size and the total length of the liquid column tube 110 can be purposely designed in consideration of the groundwater leaking from the earth surface S region.

The liquid column tube 110 is preferably formed of a transparent material so that an operator can observe the height of the water column from the outside, thereby providing more excellent experimental convenience.

A connection hose 106 is disposed between the liquid column tube 110 and the storage tank 102.

As shown in FIG. 1, the connection hose 106 is a pipeline formed between the storage tank 102 and the liquid column tube 110 so that the groundwater leaking from the earth surface S region and being stored in the storage tank 102 flows to the liquid column tube 110.

In the example shown in FIG. 1, a single storage tank 102 is fixedly disposed on the earth surface S and thus only one connection hose 106 is used to connect the storage tank 102 and the liquid column tube 110.

That is, the connection hose 106 forms a pipeline from an outlet 104 disposed on the top of the storage tank 102 to the lower part of the liquid column tube 110.

Here, a socket for coupling and fixation of the connection hose 106 may be disposed in the lower part of the liquid column tube 110.

In the example shown in FIG. 2 again, three storage tanks 102 are fixedly disposed in the same earth surface S region.

To cause the groundwater to flow from three storage tanks 102 to the lower part of the liquid column tube 110, additional connection hoses are necessary and additional sockets should be disposed in the lower part of the liquid column tube.

In this case, the connection holes 106a connected to the liquid column tube 110 and the connection hoses 106b connected to the storage tanks 102 may be separately provided and a Y-shaped or T-shaped connection pipe 108 may be used to merge the separate connection hoses 106b.

A tripod 120 for fixing the position and posture of the liquid column tube 110 may be further disposed in the liquid column tube 110.

The tripod 120 includes an annular fixing portion 122 fixed to surround the outer circumferential surface of the liquid column tube 110 and support end portions 124 that extend from the annular fixing portion 122 to the earth surface and that maintain the position and posture of the liquid column tube 110.

The size and shape of the tripod 120 can be variously selected depending on the size of the liquid column tube 110, and thus the invention is not limited to the shapes shown in FIGS. 1 and 2.

On the other hand, one or more automatic switches 130a and 130b may be disposed respectively in the upper part and the lower part of the liquid column tube 110. The automatic switches 130a and 130b are a device of automatically switching depending on an electrically-set or magnetically-set load and are a kind of valve. The rising of the water column in the liquid column tube 110 can be adjusted and controlled by the automatic switches 130a and 130b.

The groundwater introduced into the liquid column tube 110 causes the rising of the water column in the liquid column tube 110. Here, the pressure difference causing the rising of the water column is defined the water head difference.

When the water head difference of the water column in the liquid column tube 110 is known and the difference in static pressure is known, the flow velocity and the flow rate of the groundwater leaking from the earth surface can be detected, which is carried out by a pressure-type measuring unit 150.

The pressure-type measuring unit 150 is a device that measures a static pressure, a flow rate, and a flow velocity on the basis of the water head difference of the water column in the liquid column tube 110, and an example thereof is a differential pressure transmitter.

The differential pressure transmitter includes a signal processing circuit and a communication circuit using serial communication signals such as RS232 based on commercial protocols, in addition to a pressure sensor that can measure the static pressure, the flow rate, and the flow velocity on the basis of the rising of the water column in the liquid column tube 110.

When the water head difference of the water column in the liquid column tube 110 is generated due to the flow velocity and the flow rate of the groundwater leaking from the earth surface S, the pressure-type measuring unit 150 such as the differential pressure transmitter generates a corresponding signal and transmits the signal by data transmission.

In this embodiment, the differential pressure transmitter is used as the pressure-type measuring unit 150, but is only an example. The invention is not limited to the differential pressure transmitter.

As described above, without using the differential pressure transmitter as the pressure-type measuring unit 150, a separate pressure sensor, a signal processing circuit properly converting the detection signal from the pressure sensor, and a communication circuit transmitting the converted signal may be individually constructed and combined to the purpose of the invention.

It is effective to enhance the accuracy of the measurement that the pressure-type measuring unit 150 is disposed on the top opening of the liquid column tube 110.

For the fixation of the pressure-type measuring unit 150, a pedestal 140 for fixing the pressure-type measuring unit 150 may be further disposed on the top opening of the liquid column tube 110.

Figure 3:
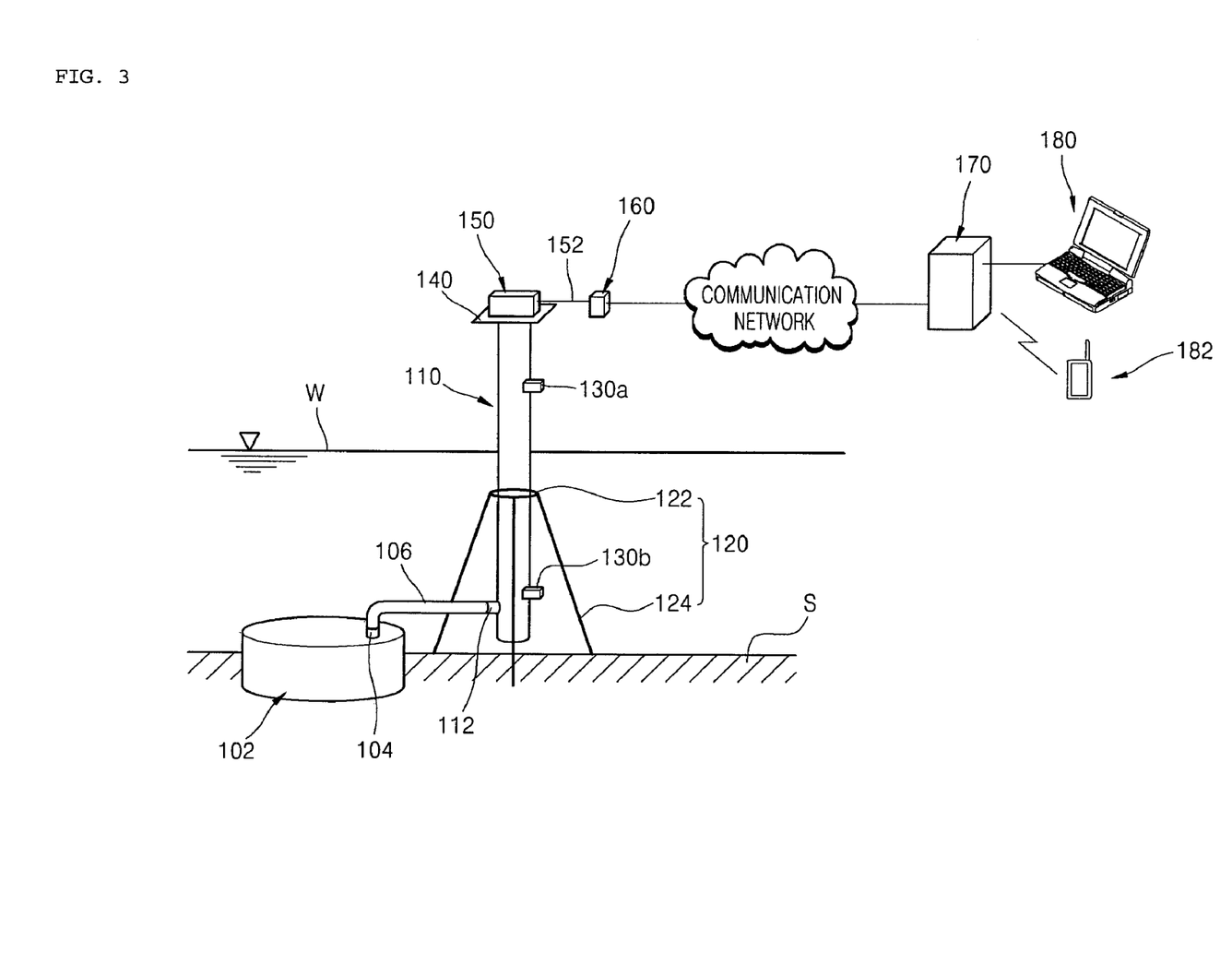
FIG. 3 is a conceptual diagram illustrating an example where a monitoring apparatus is added to the example shown in FIG. 1.
Figure 4:
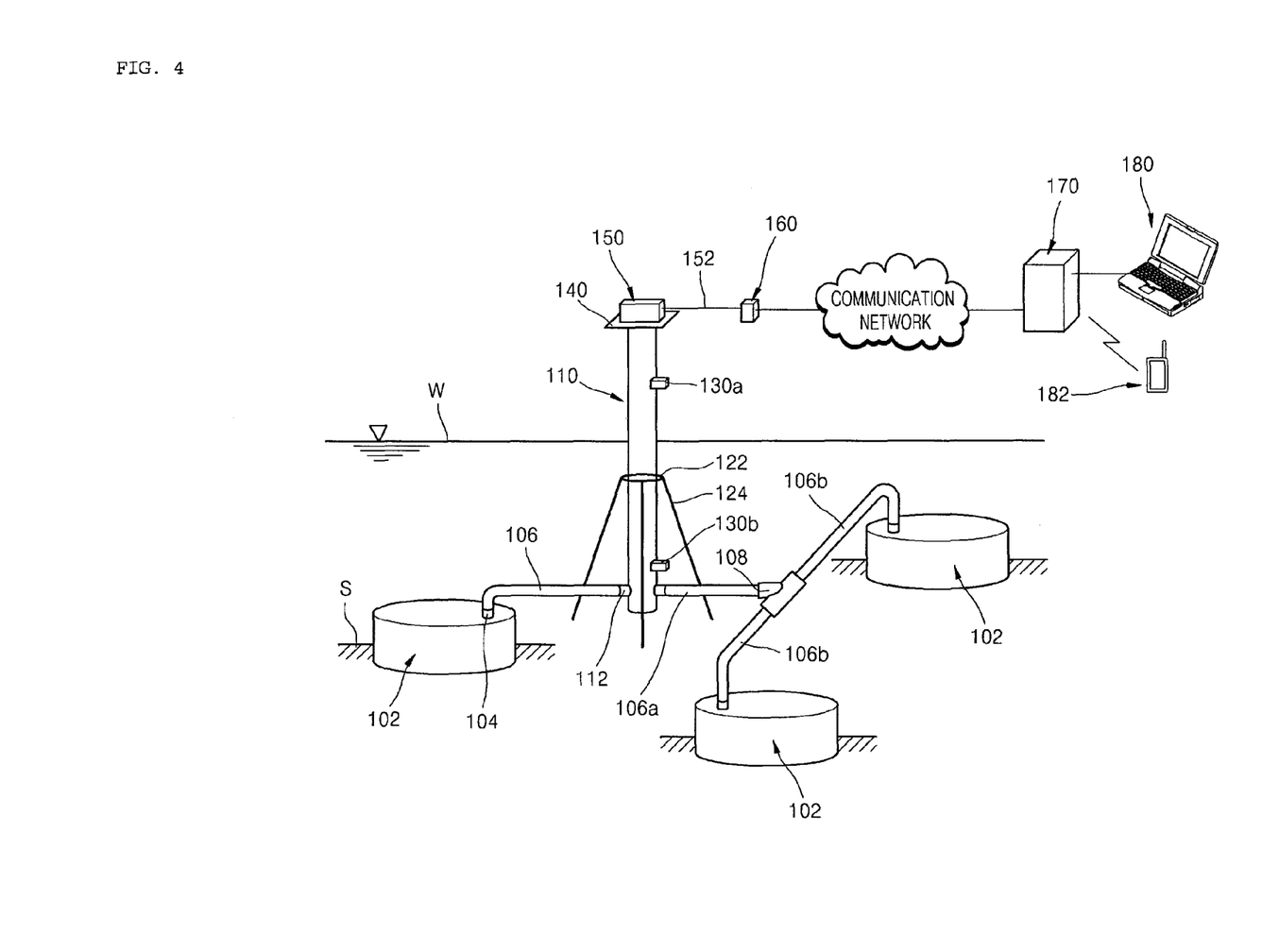
FIG. 4 is a conceptual diagram illustrating an example where a monitoring apparatus is added to the example shown in FIG. 2.

FIG. 3 is a conceptual diagram illustrating an example where a monitoring apparatus is added to the example shown in FIG. 1. FIG. 4 is a conceptual diagram illustrating an example where a monitoring apparatus is added to the example shown in FIG. 2.

Referring to FIGS. 3 and 4, it can be seen that the data on the flow velocity and the flow rate of the groundwater detected by the pressure-type measuring unit 150 is transmitted to the communication interface unit 160 via a cable 152.

The communication interface unit 160 is a device serving to couple an input terminal connected to a data input channel to an output terminal connected to a data output channel so as to transmit data between mutually communicating systems. The communication interface unit serves to transmit the data on the flow velocity and the flow rate of the groundwater transmitted from the pressure-type measuring unit 150 to the combined server unit 170 via a cable or a communication network in real time or by time zones.

The data transmitted via the communication interface unit 160 is stored in the combined server unit 170, is compared with a predetermined reference value, and is transmitted to user terminals 180 and 182 in real time, or by time zones, or on a user's request. Examples of the user terminals 180 and 182 include a user PC 180, and a user portable terminal 182.

In this way, the data on the measured flow velocity and flow rate of the groundwater leaking in the earth surface region can be transmitted to plural users or supervisors remotely located, in real time, or by time zones, or on the users' or supervisors' request.

Figure 5:
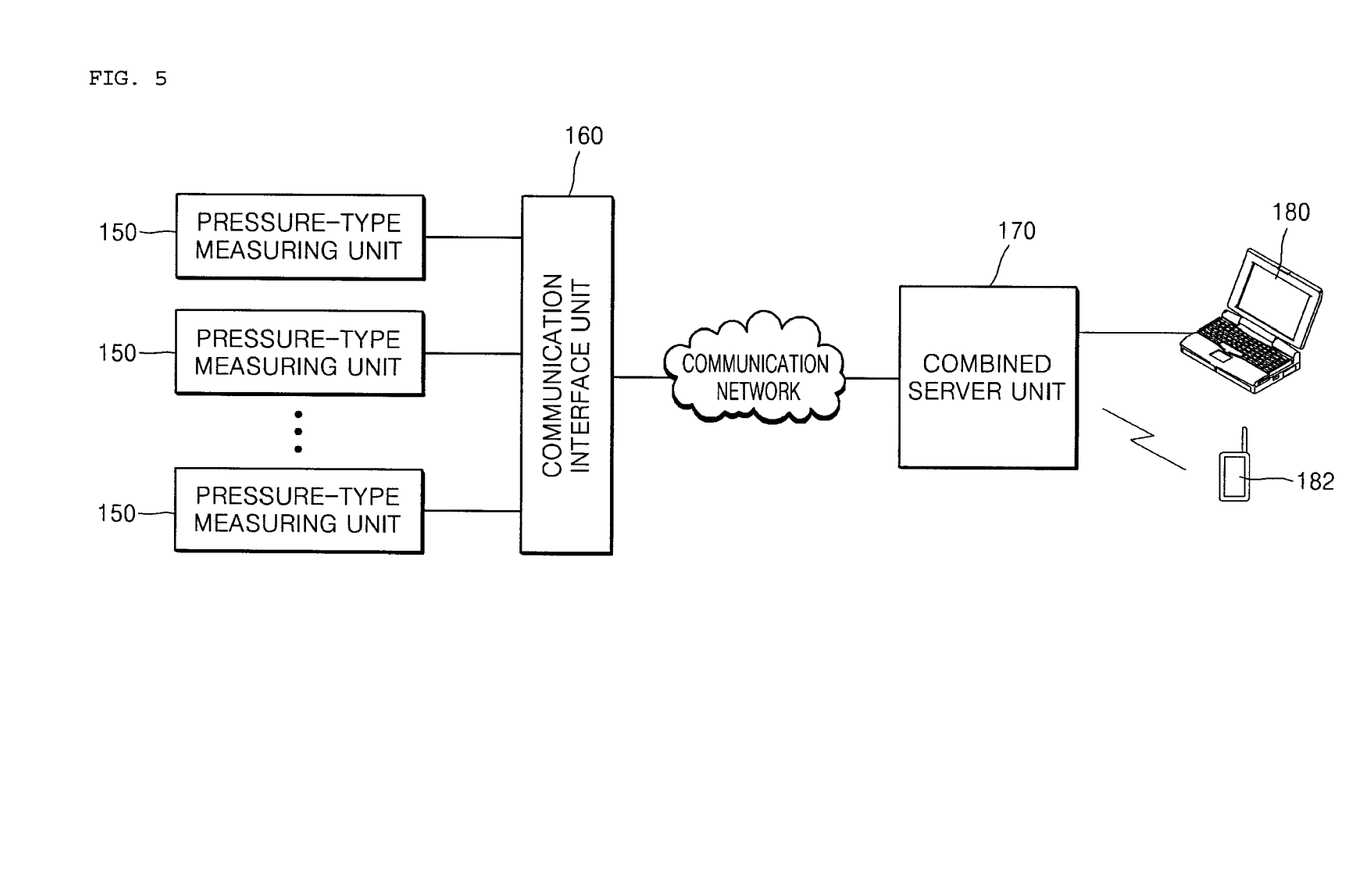
FIG. 5 is a diagram illustrating a monitoring apparatus according to another embodiment of the invention.
Figure 6:
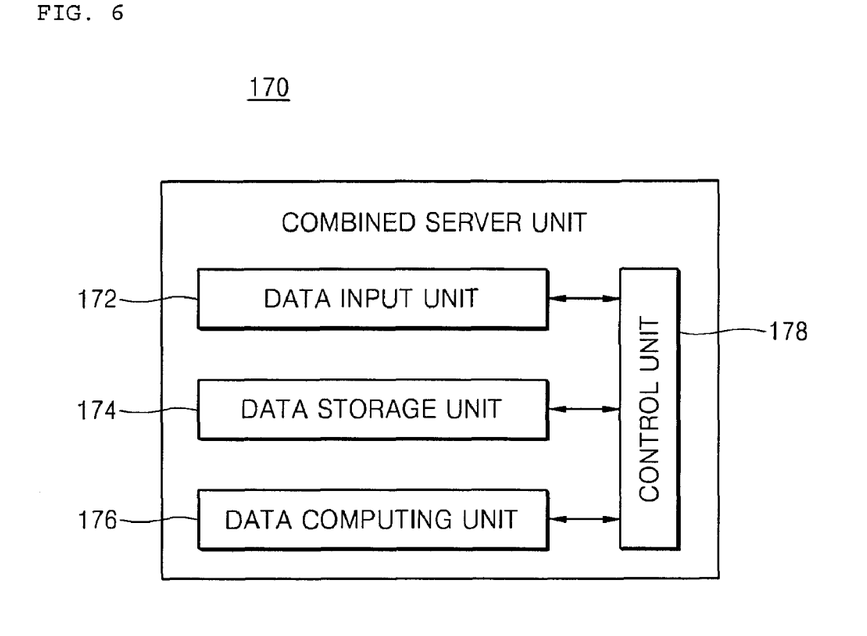
FIG. 6 is a diagram illustrating the configuration of a combined server unit in the monitoring apparatus according to the embodiment of the invention.

FIG. 5 is a block diagram conceptually illustrating the configuration of the monitoring apparatus. FIG. 6 is a block diagram illustrating the configuration of the combined server unit in the monitoring apparatus.

The monitoring apparatus and the combined server unit used in the invention will be described in detail with reference to FIGS. 5 and 6.

In the monitoring apparatus shown in FIG. 5, the data on the flow velocity and the flow rate of the groundwater detected by the pressure-type measuring unit 150 is transmitted to the communication interface unit 160 via a cable or a communication network by wired or wirelessly.

The data transmitted to the communication interface unit 160 is transmitted to the combined server unit 170 via a cable or a communication network. The combined server unit 170 stores the data, or compares the data with a predetermined reference value, or transmits the data to the user PC 180 or portable terminal 182 in real time, or by time zones, or on the user's request.

The configuration of the combined server unit 170 included in the monitoring apparatus is shown in FIG. 6.

The combined server unit 170 includes a data input unit 172, a data storage unit 174, a data computing unit 176, and a control unit 178 controlling the units so as to perform the above-mentioned functions.

The data input unit 172 is input means for inputting the data on the flow velocity and the flow rate of the groundwater from the communication interface unit.

The data storage unit 174 is storage means for recording the data input by the data input unit 172 in real time or by time zones. Here, the real time or the time zones can be adjusted by a user's instruction or setting. In adjusting the time zones, a step interval or section for measuring data can be adjusted by a user's instruction.

Although not shown in FIG. 6, a preliminary DB unit (not shown) for storing the data other than the data storage unit 174 may be further provided. The preliminary DB unit can store a large amount of data for a long term and is thus advantageous for the research of geological environments of the surface earth region.

The data computing unit 176 is analysis and computing means for comparing the data input to the data input unit 172 with a predetermined reference value (where the "reference value" may be averages of the flow velocities and the flow rates for a predetermined period such as one week, one month, one year, three years, and 10 years, or may be a default value set in advance by a user) and analyzing and computing the data in accordance with the user's instruction to obtain statistical data on the flow velocity and the flow rate of groundwater.

The combined server unit 170 may include the control unit 178 controlling the operations of the data input unit 172, the data storage unit 174, and the data computing unit 176, whereby the combined server unit 170 can be stably controlled and driven with entire control algorithms.

Referring to FIG. 5 again, the data converted into a type of information suitable for transmission to a user by the combined server unit 170 described with reference to FIG. 6 is transmitted to the user PC 180 or the user portable terminal 182.

Examples of the portable terminal 182 include various portable radio terminals such as a PDA and a mobile phone.

The data to be transmitted to the user PC 180 or the portable terminal 182 from the combined server unit 170 may have various data types such as text information, image information, and sound information. In 3G communications and 4G communications to be commercialized at once, the data can be transmitted to the user as image information simulated in real time as well as commercialized SMS (Short Messaging Service) or MMS (Multimedia Messaging Service).

While the invention has been described with reference to the finite embodiments and drawings, the invention is not limited to the embodiments, but it will be understood by those skilled in the art that the invention can be modified in various forms without departing from the technical spirit of the invention taught from the appended claims. Therefore, the technical spirit of the invention should be read from only the appended claims and the equivalent modifications thereof should belong to the spirit and scope of the invention.

What is claimed is:

1. An apparatus for measuring a flow velocity and a flow rate of groundwater leaking from the earth surface, comprising:

a storage tank that is fixed to close a side surface and a top surface of an earth surface region from which the groundwater leaks and that stores the groundwater leaking from the earth surface;

a liquid column tube that causes the groundwater stored in the storage tank to introduce thereto and causes a water column to rise; and a pressure-type measuring unit that is formed in a top opening of the liquid column tube and that senses a differential pressure on the basis of a water head difference of the water column rising in the liquid column tube to detect the flow velocity and the flow rate of the groundwater leaking from the earth surface.

2. The apparatus according to claim 1, wherein one or more of the storage tanks are fixedly disposed in an earth surface region from which the groundwater leaks and the storage tank has a cylindrical shape.

3. The apparatus according to claim 1, wherein a connection hose forming a pipeline between the storage tank and the liquid column tube is formed between the storage tank and the liquid column tube so that the groundwater leaking from the earth surface region and being stored in the storage tank flows into the liquid column tube.

4. The apparatus according to claim 3, wherein the connection hose has one end connected to an upper part of the storage tank and the other end connected to a lower part of the liquid column tube.

5. The apparatus according to claim 4, wherein a socket for connection of the connection hose is disposed in the lower part of the liquid column tube.

6. The apparatus according to claim 1, wherein a tripod for fixing the position and posture of the liquid column tube is further disposed in the liquid column tube.

7. The apparatus according to claim 1, wherein an automatic switch is disposed in the upper part or the lower of the liquid column tube.

8. The apparatus according to claim 1, wherein the pressure-type measuring unit is a differential pressure transmitter.

9. The apparatus according to claim 1, wherein a pedestal for fixedly disposing the pressure-type measuring unit is disposed on a top opening of the liquid column tube.

10. A monitoring apparatus employing an apparatus for measuring a flow velocity and a flow rate of groundwater leaking from the earth surface, comprising:

a storage tank that is fixed to close a side surface and a top surface of an earth surface region from which the groundwater leaks and that stores the groundwater leaking from the earth surface;

a liquid column tube that causes the groundwater stored in the storage tank to introduce thereto and causes a water column to rise;

a pressure-type measuring unit that is formed in a top opening of the liquid column tube and that senses a differential pressure on the basis of a water head difference of the water column rising in the liquid column tube to detect the flow velocity and the flow rate of the groundwater leaking from the earth surface;

a communication interface unit that transmits data on the flow velocity and the flow rate of the groundwater detected by the pressure-type measuring unit; and a combined server unit that stores the data transmitted from the communication interface unit, compares the data with a predetermined reference value, and transmits the data stored or compared with the reference value to a user terminal in real time, or by time zones, or on a user's request.

11. The monitoring apparatus according to claim 10, wherein the combined server unit includes:

a data input unit that receives the data on the flow velocity and the flow rate from the communication interface unit;

a data storage unit that stores the data received by the data input unit in real time or by time zones;

a data computing unit that compares the data received by the data input unit with a predetermined reference value and analyzes and computes the data to prepare statistical data on the flow velocity and the flow rate of the groundwater in accordance with the user's instruction; and a control unit that controls operations of the data input unit, the data storage unit, and the data computing unit.

12. The monitoring apparatus according to claim 10, wherein the data on the flow velocity and the flow rate of the groundwater transmitted from the combined server unit is transmitted to the user terminal in the form of any one of text information, image information, and sound information.

13. The monitoring apparatus according to claim 10, wherein the combined server unit further includes a preliminary DB unit that separately stores the data transmitted from the communication interface unit and a data difference between the data and the predetermined reference value.

14. The monitoring apparatus according to claim 10, wherein one or more of the storage tanks are fixedly disposed in an earth surface region from which the groundwater leaks and the storage tank has a cylindrical shape.

15. The monitoring apparatus according to claim 10, wherein a connection hose forming a pipeline between the storage tank and the liquid column tube is formed between the storage tank and the liquid column tube so that the groundwater leaking from the earth surface region and being stored in the storage tank flows into the liquid column tube.

16. The monitoring apparatus according to claim 15, wherein the connection hose has one end connected to an upper part of the storage tank and the other end connected to a lower part of the liquid column tube.

17. The monitoring apparatus according to claim 16, wherein a socket for connection of the connection hose is disposed in the lower part of the liquid column tube.

18. The monitoring apparatus according to claim 10, wherein a tripod for fixing the position and posture of the liquid column tube is further disposed in the liquid column tube.

19. The monitoring apparatus according to claim 10, wherein an automatic switch is disposed in the upper part or the lower of the liquid column tube.

20. The monitoring apparatus according to claim 10, wherein the pressure-type measuring unit is a differential pressure transmitter.

* * * * *